Nov. 12, 1957 T. H. BONN 2,813,207

ELECTRICAL CIRCUIT WITH TWO STABLE STATES

Filed March 29, 1955 8 Sheets-Sheet 1

INVENTOR

THEODORE H. BONN

BY Charles C. English

AGENT

INVENTOR
THEODORE H. BONN
BY Charles C. English
AGENT

Nov. 12, 1957 T. H. BONN 2,813,207

ELECTRICAL CIRCUIT WITH TWO STABLE STATES

Filed March 29, 1955 8 Sheets-Sheet 3

INVENTOR

THEODORE H. BONN

BY

Charles C. English

AGENT

Nov. 12, 1957 T. H. BONN 2,813,207

ELECTRICAL CIRCUIT WITH TWO STABLE STATES

Filed March 29, 1955 8 Sheets-Sheet 4

INVENTOR

THEODORE H. BONN

BY Charles C. English

AGENT

ELECTRICAL CIRCUIT WITH TWO STABLE STATES

Filed March 29, 1955 8 Sheets-Sheet 5

INVENTOR

THEODORE H. BONN

BY Charles C. English

AGENT

ELECTRICAL CIRCUIT WITH TWO STABLE STATES

Filed March 29, 1955 8 Sheets-Sheet 6

INVENTOR
THEODORE H. BONN
BY Charles C. English
AGENT

INVENTOR
THEODORE H. BONN
BY
Charles C. English
AGENT

INVENTOR
THEODORE H. BONN

BY Charles C. English
AGENT

United States Patent Office
2,813,207
Patented Nov. 12, 1957

2,813,207

ELECTRICAL CIRCUIT WITH TWO STABLE STATES

Theodore H. Bonn, Philadelphia, Pa., assignor, by mesne assignments, to Sperry Rand Corporation, New York, N. Y., a corporation of Delaware Application March 29, 1955, Serial No. 497,549

31 Claims. (Cl. 307—88)

This invention relates to electrical circuits with two stable states and more particularly to flip-flop circuits. One distinction between this invention and most prior ones is that the present invention has both non-complement and complement outputs.

In the prior art, a large number of so-called flip-flop circuits employ vacuum tubes or other elements likely to burn out. Moreover, there are certain types of systems in which flip-flop circuits are used where the principal components of the system are magnetic amplifiers. It is desirable that the flip-flop circuit also employ magnetic amplifier principles in order that it may most effectively be adapted to those overall systems employing magnetic amplifiers as their principal components. Prior applications of the same assignee as that of the present application have already disclosed in detail a number of flip-flop circuits embodying magnetic amplifiers as their principal components. The present application is an improvement over these prior ones especially in connection with the output circuit. It is desirable in some circumstances to have both a non-complement output (hereinafter often referred to as a "direct" output), and also a complement output. It is further desirable in some cases that the output when the device is in one stable state be a continuous signal. When it is in the other stable state, it is often desired that the output be a different continuous signal (for example no output current at all). The last two sentences bring out an important distinction over the prior art since in most of the prior art flip-flop circuits embodying magnetic amplifiers, the output, at least in one stable state, has been in the form of a group of pulses.

It is a primary object of the invention to provide an improved flip-flop circuit embodying magnetic amplifiers and which is adapted for use in systems the principal components of which are also magnetic amplifiers.

Another object of the invention is to provide a flip-flop circuit employing magnetic amplifiers in which the output in one stable state is a continuous signal.

An additional object of the invention is to provide a flip-flop circuit having both direct and complement outputs.

Still another object of the invention is to provide a flip-flop circuit that is unusually reliable in operation.

Another object of the invention is to provide a flip-flop circuit that is low in cost.

A further object of the invention is to provide a flip-flop circuit with two different forms of output signals therefrom, either of which signals will indicate the stable state in which the flip-flop circuit is operating at any given time.

It is also an object of the invention to provide a flip-flop circuit having advantages in regard to the type of output signal available therefrom.

Yet another object of the invention is to provide a flip-flop circuit which will perform the above named functions with greater simplicity of construction and operation than has heretofore been possible.

Briefly speaking, the invention employs two magnetic amplifiers. In the preferred form of the invention each magnetic amplifier has both direct and complement outputs. First and second sources of spaced power pulses respectively energize the two amplifiers, the power pulses of one source occurring during the spaces between the power pulses of the other source. The outputs of the two amplifiers are combined to provide two different output signals for the device. Feedback means is coupled to one of these combined outputs. Gating means controlled by the two sources of pulses and by the feedback means causes the output of one amplifier to trigger the input of the other so that in one stable state there is a recycling characterized by the output of the first amplifier controlling the input of the second which causes the output of the second to control the input of the first, etc. There is a set input which starts the recycling, and a reset input which effectively controls the feedback path.

Figure 1:
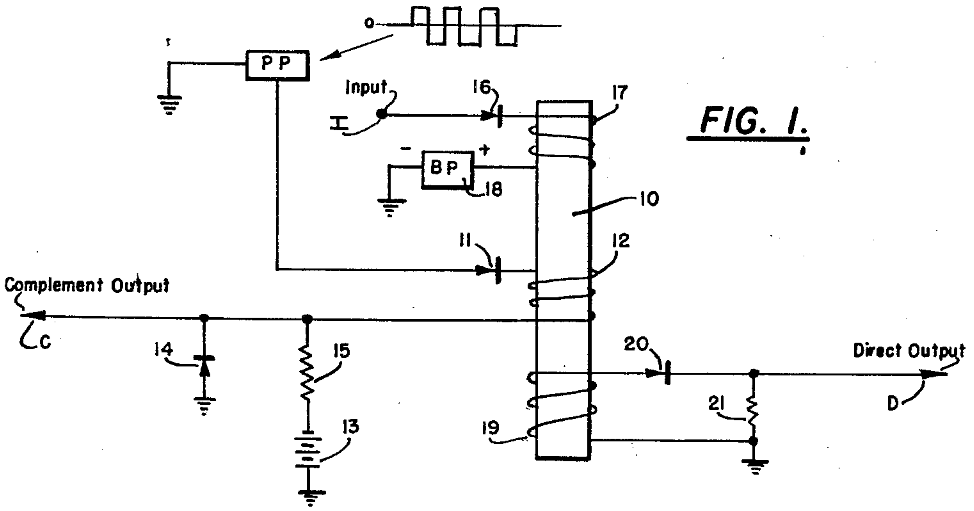
Figure 1 is a schematic diagram of one form of magnetic amplifier that may be employed in connection with the invention.

In order to understand the preferred form of the present invention it is desirable to understand the magnetic amplifier of Figure 1. This magnetic amplifier is substantially identical in construction and mode of operation with that shown in Figure 21 of the prior copending application of John Presper Eckert, Jr. and Theodore H. Bonn, Serial No. 382,180, filed September 24, 1953, entitled "Signal Translating Device" and assigned to the same assignee as that of the present invention.

Figures 2, 3, 4:
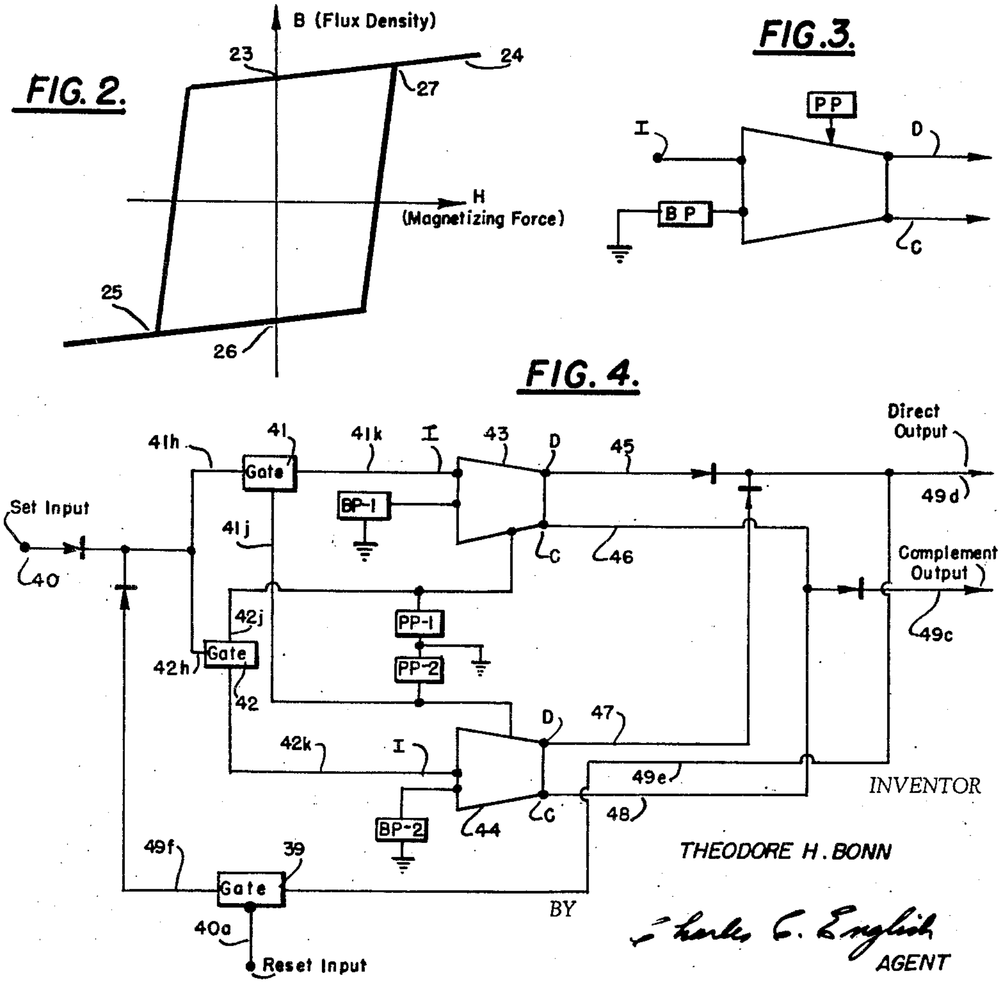
Figure 2 is an idealized hysteresis loop for the core material of the device of Figure 1.
Figure 3 is a block diagram of the device of Figure 1.
Figure 4 is a block diagram of one form of the invention.

This magnetic amplifier has a magnetic core which may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

In Figure 1 a source of power pulses PP emits a square wave alternating current, the positive excursions of which are hereinafter called power pulses. Source PP has low internal impedance, whereby the pulses therefrom all have substantially equal potential amplitude. When the coil 12 has low impedance these pulses flow through rectifier 11 and coil 12 to complement output C. The impedance of the core is controlled by the input coil 17 which is fed by input signals at I through rectifier 16, coil 17, source of blocking pulses 18, to ground. There is also a non-complement or direct output D which is supplied with current from secondary winding 19 through rectifier 20. Load resistor 21 may be employed.

A complement output is one which appears in the absence of control pulses at the input I. It will now be explained how the complement output occurs. In the absence of any input signal at I, there will be no flow of current in coil 17. Hence, successive positive power pulses from source PP may readily flow through rectifier 11, coil 12 to complement output C. The coil 12 will have low impedance since the power pulses are of such magnitude as to drive the core 10 to saturation point 24 (as shown in Figure 2) whereby the core becomes the substantial equivalent of an air core and the coil 12 has low impedance. During the spaces between the positive power pulses of source PP, in other words while output of the source PP is going negative, there will be no flow of current in coil 12, in view of the polarity of rectifier 11, and therefore the magnetization of the core will return from point 24 to remanence point 23 on the hysteresis loop of Figure 2. Hence, each positive pulse will drive the core from point 23 to point 24 and during the spaces between the pulses the core will return from point 24 to point 23. In this situation there will be substantially no direct output at D since the core is saturated and variations in the flux density through coil 19 are small. Therefore the current induced in coil 19 is negligible.

If it now be assumed that a positive control pulse is received at input I during the space between two positive power pulses of source PP, the input signal flows through the blocking pulse generator 18 to ground. The blocking pulse generator 18 normally has zero voltage output during the periods between the power pulses. This input signal will revert the core from point 23, where it was found following the last positive power pulse, to point 25. At the conclusion of the input pulse, the core will pass to remanence point 26. The next positive power pulse from source PP will flow through rectifier 11, coil 12, and the complement output to ground and will tend to drive the core from remanence point 26 to point 27. In fact, the positive going power pulses have amplitude and duration so selected that the pulse will drive the core from point 26 to point 27 and usually no further. Since the major portion of this operating path lies on the unsaturated portion of the hysteresis loop, the coil 12 will have high impedance, the change of flux in the core will be very large and a large potential will be induced in secondary winding 19 which will cause a flow of current through rectifier 20 and shunting resistor 21. Hence there will be a high potential at direct output D.

In event it is desired to eliminate from the output C the small current usually known as the "sneak" current, which flows through coil 12 during the time the latter has high impedance, the battery 13, rectifier 14 and resistor 15 may be added. These parts cause a small current to flow from the positive pole of battery 13 to ground, through rectifier 14 and resistor 15 to the negative pole of battery 13. The battery 13 should preferably cause a current to flow in path 13—14—15 which is greater than the natural sneak current in coil 12 since there is in this case an unusually large sneak current due to the presence of load resistor 21. That resistor being across secondary 19 causes the "sneak" current in coil 12 to be unusually large and therefore the current from source 13 should be large enough to overcome the large "sneak" current in coil 12. Hence, the current in complement output C is negligible during the intervals when the core is operating on unsaturated portions of the hysteresis loop thereof. In order to prevent flow of current from source PP through coil 12 from inducing current in winding 17, which might flow to the input I and adversely affect the input apparatus, whatever that may be, the blocking pulse generator 18 may be employed. Generator 18 produces a series of spaced pulses usually synchronized with the positive power pulses of source PP, so as to apply a large positive potential to the cathode of rectifier 16 whenever there is current flowing in coil 12. This cuts off rectifier 16 and prevents any potential induced in winding 17 from producing a current flow therein.

Summarizing the operation of Figure 1, it may be stated that input pulses are always supplied during the spaces between positive power pulses of source PP. In event no such input signal is applied, each positive power pulse from source PP will readily flow through coil 12 and appear at the complement output C. In event such an input signal does appear, there will be no output at complement output C but there will be an output at direct output D. The outputs always occur one time period following the input pulse.

For purposes of simplicity in connection with this application, the legend shown in Figure 3 will be employed to illustrate the magnetic amplifier of Figure 1. The input is represented by I, the direct output by D and the complement output by C.

It is understood that the foregoing magnetic amplifier of Figure 1 is not part of the invention claimed in this application, it being shown in Figure 21 of the aforesaid prior copending application of John Presper Eckert, Jr. and Theodore H. Bonn. It is illustrated here merely to show a form of magnetic amplifier with direct and complement outputs suitable for use in this application.

Figure 5:
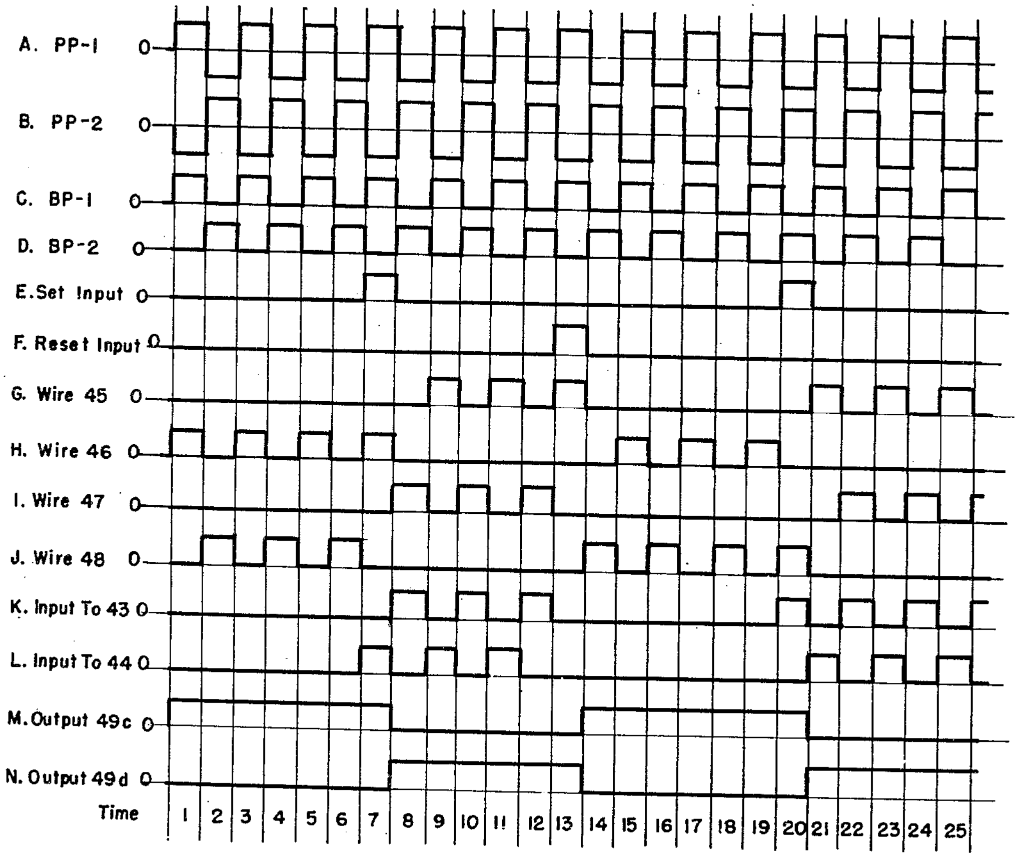
Figure 5 is a timing diagram for the device of Figure 4.

Figure 4 is a block diagram of one form of the invention and will now be explained in detail with particular reference to Figure 5 which is a timing diagram of the apparatus of Figure 4. In Figure 4 there is a "set" input 40 for receiving signals to place the apparatus in one stable state, and a "reset" input 40A for receiving signals to place the device in its other stable state. The system has gates 41 and 42 which have first triggering inputs 41H and 42H controlled by pulses from set input 40. Gate 41 also has triggering input 41J controlled by positive going pulses of source PP–2. Gate 42 also has input 42J controlled by the positive going pulses of source PP–1. Source PP–1 also supplies power pulses to the magnetic amplifier 43 which is identical in construction and mode of operation to the magnetic amplifier of Figure 1. Source PP–2 supplies power pulses to magnetic amplifier 44 which has the same construction and mode of operation as that of Figure 1. The relation of the waves produced by source PP–1, PP–2, BP–1 and BP–2 is shown in Figure 5. It is noted that the positive going pulses of source PP–2 appear during the spaces of positive going pulses of source PP–1 and that blocking pulses of source BP–1 appear at the same time as the positive going pulses of source PP–1. In addition, the positive going blocking pulses of source BP–2 occur concurrently with the positive going pulses of source PP–2. The direct outputs 45 and 47 of amplifiers 43 and 44, respectively, are combined to form a single direct output 49D. Similarly, the complement outputs 46 and 48 of amplifiers 43 and 44 are combined to form a single complement output 49C. There is a feedback path 49E which in this form of the invention is connected to the direct output 49D and supplies triggering pulses to gate 39. Other triggering pulses to gate 39 are supplied by reset input 40A. The output signal of gate 39 is fed to the inputs 41H and 42H of gates 41 and 42. Gate 41 has two inputs 41H and 41J. The gate 41 produces an output at 41K whenever the two inputs 41H and 41J are concurrently energized by positive going pulses. Likewise, gate 42 has two inputs 42H and 42J and this gate has an output at 42K whenever the two inputs 42H and 42J are concurrently energized by positive going pulses. The gate 39 is an inhibition gate. It normally allows pulses received on wire 49E to flow through the gate to the inputs 41H and 42H, however whenever a signal is received at reset input 40A, the gate 39 interrupts the feedback path of wire 49E.

The mode of operation of the device of Figure 4 will now be described with reference to the timing diagram of Figure 5. In Figure 5 it is assumed that prior to time period 7 no set input pulse has been received. Consequently, there will be no signals on the inputs I of amplifiers 43 and 44, and hence these amplifiers will not have any direct outputs, in other words there will be no outputs on wires 45 and 47 prior to time period 7. However, since in the absence of input pulses the amplifiers have complement outputs, the amplifier 43 will cause to appear on wire 46 power pulses concurrent with the positive going pulses of source PP–1. Hence, as shown in Figure 5, there will be positive going pulses on wire 46 at time periods 1, 3, 5 and 7. Likewise, since amplifier 44 has no input, its complement output will have pulses concurrent with each of the pulses of source PP–2 and therefore pulses will appear on wire 48 at time periods 2, 4 and 6 as shown in Figure 5. The pulses on wires 46 and 48 will be combined to produce an output pulse covering time periods 1 to 7 inclusive. This pulse will appear at the complement output 49C.

The "set" input pulse at time period 7 will appear simultaneously with a positive going pulse of source PP–1. Hence, at time period 7 there will be concurrent positive pulses at the inputs 42H and 42J of gate 42, whereby this gate produces an output signal at time period 7 on wire 42K, as shown in Figure 5L. This pulse will revert the core of amplifier 44 causing the next positive going pulse of source PP–2 to flow through amplifier 44 to the direct output 47, as shown at time period 8 of Figure 5I. There is no signal on wire 48 at this time period since the preceding input pulse inhibited the output at the complement output C of the magnetic amplifier 44. The pulse appearing at time period 8 on wire 47 flows to feedback wire 49E, through gate 39, to input 41H of gate 41. It appears at set input 41H concurrently with pulse from source PP–2 at input 41J and therefore at time period 8 the gate 41 has a pulse in its output 41K which flows to the input of amplifier 43 at time period 8, as shown in Figure 5K. This pulse reverts the core of amplifier 43 and thus causes the next power pulse from source PP–1 to flow through amplifier 43 to the direct output 45, hence a pulse appears on wire 45 at time period 9 as shown in Figure 5G. This pulse flows through the feedback path 49E to the input 42H of gate 42 and occurs concurrently with a positive going pulse from source PP–1 on input 42J, therefore gate 42 causes a flow of current to the input of amplifier 44, as shown, at time period 9, see Figure 5L. This input signal to magnetic amplifier 44 reverts the core of that amplifier and thus causes the next power pulse from source PP–2 to induce a pulse in direct output 47 at time period 10, as shown in Figure 5I. There is no complement output on wire 48 and the pulse at time period 10 on wire 47 flows through feedback path 49E, gate 39, to input 41H and appears there concurrently with a positive going power pulse of source PP–2 on input 41J, so that there is an output at 41K from the gate to the input of magnetic amplifier 43 at time period 10 of Figure 5K. Hence, the next power pulse from source PP–1 at time period 11 will induce a direct output in wire 45 but there will be no complement output in wire 46. This direct output in wire 45, appearing at time period 11, will flow through feedback path 49E, gate 39, to input 42H and will appear there concurrently with the next positive pulse from source PP–1 on input 42J, so that the gate is opened and there is an output at 42K which flows to the input of amplifier 44 at time period 11 as shown in Figure 5L. Hence, the next power pulse from source PP–2 at time period 12 will flow to output 47 but there will be no complement output at 48 and the pulse in wire 47 will be fed back through path 49E to the input 41H of gate 41 and will appear there concurrently with a pulse from source PP–2 so that there will be a signal in the output 41K of gate 41 at time period 12 as shown in Figure 5K. This will revert the core of amplifier 43 and produce an output signal at wire 45 but none at 46 and the output at 45, occurring at time period 13, will tend to flow through feedback path 49E. However, in view of the fact that a reset input signal has now appeared, as shown in Figure 5F, at time period 13, a pulse may not pass the gate 39 and consequently both inputs 41H and 42H become idle. Hence, there is no output from either gate 41 or 42 and hence no input to either amplifier 43 or 44. Therefore, there is no direct output from either amplifier 43 or 44 but there will be complement outputs from both amplifiers appearing concurrently with the power pulses fed thereto. In other words, as shown in Figure 5H, there will be complement output pulses from amplifier 43 at time periods 15, 17 and 19 and there will be complement outputs on wire 48 at time periods 14, 16, 18 and 20. This condition will continue until another set input signal is received at 40, for example the input signal received at time period 20 in Figure 5E. This input signal will have the same effect as the first one which occurred at time period 7 and will revert the device to its other stable state.

It is noted that while pulses appear at direct outputs 45 and 47, as shown in Figures 5G and I, that these pulses combine in the output 49D to form substantially continuous signals and that while there are pulses in wires 46 and 48, these pulses combine to form substantially continuous signals in the wire 49C; all as shown in Figures 5N and M.

Figure 6:
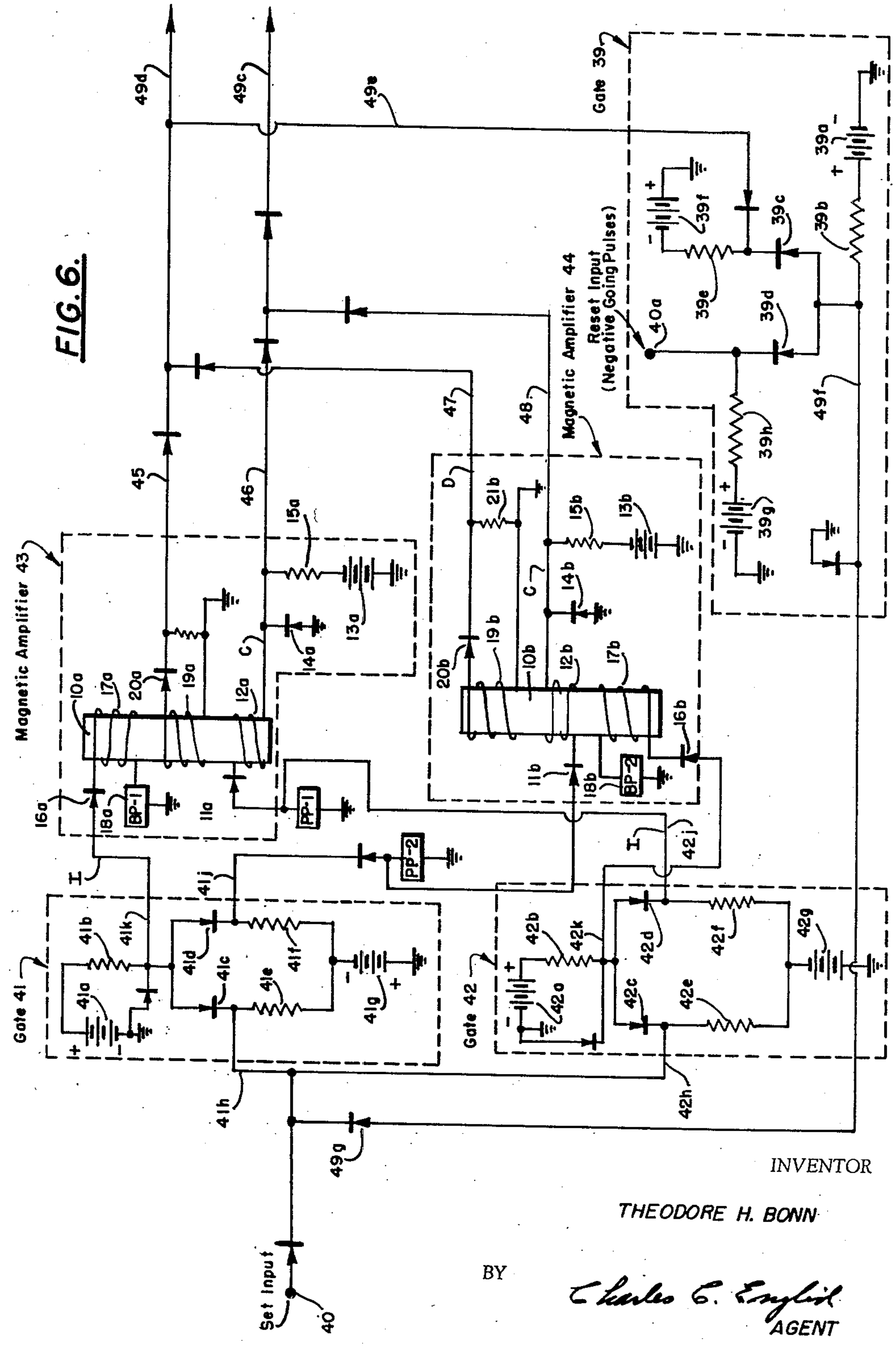
Figure 6 is a schematic diagram of the device of Figure 4.

Figure 6 illustrates the circuit of Figure 4 in greater detail. For example, the gate 41 is shown as including a battery 41A, the negative terminal of which is grounded and the positive terminal of which is connected to a resistor 41B. The other end of that resistor is connected to the anodes of rectifiers 41C and 41D, the cathodes of which are respectively connected to resistors 41E and 41F. The other ends of these resistors are grounded through battery 41G. In the absence of pulses at the inputs 41H and 41J, substantially all of the potential of battery 41A appears across resistor 41B and substantially all the potential of battery 41G appears across resistors 41E and 41F. Therefore the output 41K is at substantially ground potential. The situation is not substantially changed in event a signal appears on one input alone. Assume, for example, that a signal appears at the input 41J. That will raise the cathode of rectifier 41D to a positive value and cut off flow of current through rectifier 41D, however, there will still be a current flowing from battery 41A, resistor 41B, rectifier 41C, resistor 41E, battery 41G, to ground. The potential drop across resistor 41E will still be substantially equal to that across battery 41G and potential drop across resistor 41B will still be essentially equal to that across battery 41A, and therefore output 41K will still remain at ground potential. However, if both inputs 41H and 41J are raised to a high positive value concurrently, both rectifiers 41C and 41D will be cut off and the potential of battery 41A will be impressed on output 41K through resistor 41B and a current will then flow from battery 41A, resistor 41B, rectifier 16A, coil winding 17A, blocking pulse generator 18A, to ground. Since input 41J is only energized during the spaces between pulses of blocking pulse generator 18A, current in the aforesaid path (through winding 17A) always occurs when the potential of generator 18A is zero. Magnetic amplifier 43 is identical with the magnetic amplifier of Figure 1 and bears similar reference numbers, except that in Figure 6 the subscript A has been added. Likewise, the magnetic amplifier 44 is identical with the magnetic amplifier of Figure 1 except that in Figure 6 the subscript B has been added. The gate 42 is identical in construction and mode of operation to the gate 41 and corresponding parts of the two gates bear like subscripts to their respective reference numbers. For example, resistor 41F of gate 41 corresponds to resistor 42F of gate 42. In connection with gate 42, when positive pulses appear at inputs 42H and 42J concurrently, the cathodes of rectifiers 42C and 42D are raised to positive values and the rectifiers are cut off, whereby current may flow from battery 42A, resistor 42B, rectifier 16B, control winding 17B, blocking pulse generator 18B, to ground. This action can only occur when generator PP–1 is going positive and consequently the winding 17B is always energized during the spaces between power pulses of source BP–2. At the time current flows through coil 17B, the blocking pulse generator 18B is therefore not generating any potential.

The gate 39 may be of the type shown or may have the circuit of gate 73 of Figure 8 hereinafter described. As shown in Figure 6, the gate 39 is one which allows pulses to flow from its input 49E through the gate except when a negative reset input signal is received at input 40A. The form of gate 73 of Figure 8 performs the same function except it responds to a positive reset input pulse instead of a negative one. Considering the gate shown in Figure 6, in the absence of a signal on input lead 49E, current will flow from battery 39A through resistor 39B, rectifier 39C, resistor 39E, battery 39F, to ground. The potential of battery 39A will appear across resistor 39B and the potential of battery 39F will appear across the resistor 39E. As a result, the output lead 49F is at ground potential. This situation is not altered by the battery 39G since its positive potential cuts off the cathode of rectifier 39D. If now a positive signal appears upon input 49E, it will raise the potential on the cathode of rectifier 39C, cutting off this rectifier and allowing the potential of battery 39A to be impressed through resistor 39B and wire 49F to inputs 41H and 42H of the gates 41 and 42 respectively. Hence, in the absence of a reset input pulse at 40A, any positive signals appearing on feedback wire 49E will appear at 49F and at the inputs 41H and 42H. If now at the start of a feedback signal on wire 49E, a reset input pulse appears at input 40A, the result will be as follows, remembering that the reset signal is, in this case, always a negative going pulse. Such a negative going pulse impressed on the right end of resistor 39H will overcome the potential of battery 39G and bias the cathode of rectifier 39D substantially to zero potential. Hence, the potential at the anode of rectifier 39D will become zero as will that of the wire 49F. No pulse will flow through rectifier 49G, hence there will be no signal at the inputs 41H and 42H.

In order to illustrate in more detail the construction and mode of operation of the circuit of Figure 6, assume that the apparatus is in the normal off position as illustrated by time periods 1 to 6 inclusive of Figure 5. In that situation any positive pulses appearing at source PP–1 will flow through coil 12A to output wires 46 and 49C, and any positive going pulses of source PP–2 will flow through rectifier 11B, coil 12B, and output wires 48 and 49C. Hence, complement outputs will appear on wire 49C which will combine to form a continuous signal as shown at time periods 1 to 7 inclusive of Figure 5M. If it now be assumed that a positive pulse appears at set input 40, it will raise gate inputs 41H and 42H to a high positive potential, cutting off rectifiers 41C and 42C. If as shown in Figure 5E, this input pulse occurs while source PP–1 is going positive, then input 42J will likewise be going positive and the gate 42 will allow current to flow from battery 42A, through resistor 42B, rectifier 16B, control winding 17B, and blocking pulse generator 18B, to ground. This will reset the core 10B during the space between two positive pulses of generator PP–2 so that the next pulse from that generator, which appears at time period 8, will meet with high impedance in coil 12B and will therefore not flow to output 48. However, it will induce in coil 19B a potential which will produce a signal at time period 8 at the direct output 47 as shown at time period 8 of Figure 5I. This pulse will flow through wire 47, feedback path 49E, and cut off the cathode of rectifier 39C, whereby current from battery 39A will raise the potential of wire 49F and again raise the potential of inputs 41H and 42H, this all occurring at time period 8 simultaneously with pulse PP–2 which is impressed upon input 41J. The gate 41 will therefore allow a pulse to flow from battery 41A, through resistor 41B, rectifier 16A, control winding 17A, and generator 18A, to ground. This will reset the core 10A during the spaces between power pulses of source PP–1 so that the next pulse from that source, occurring at time period 9, will meet with high impedance in coil 12A and therefore will not produce an output at 46, but will induce a direct output into winding 19A which will appear at wire 45. This pulse will be fed back through the gate 39, the same as the previous pulse that appeared on wire 47, and will cause gate 42 to open and the cycle of operations to be repeated. This cycle of operations will continue until a reset pulse at input 40A interrupts the feedback path at which time both inputs 41H and 42H will remain at ground potential and no currents will be fed to either of the control windings 17A and 17B. Hence, the power pulses from sources PP–1 and PP–2 can readily flow through coils 12A and 12B which now have low impedance and there will be large complement outputs on wires 46 and 48 but substantially no outputs on wires 45 and 47 and the device will now be in its original stable state. Another set input pulse at 40 will have the same effect as the one mentioned at time period 7.

Figures 7, 9:
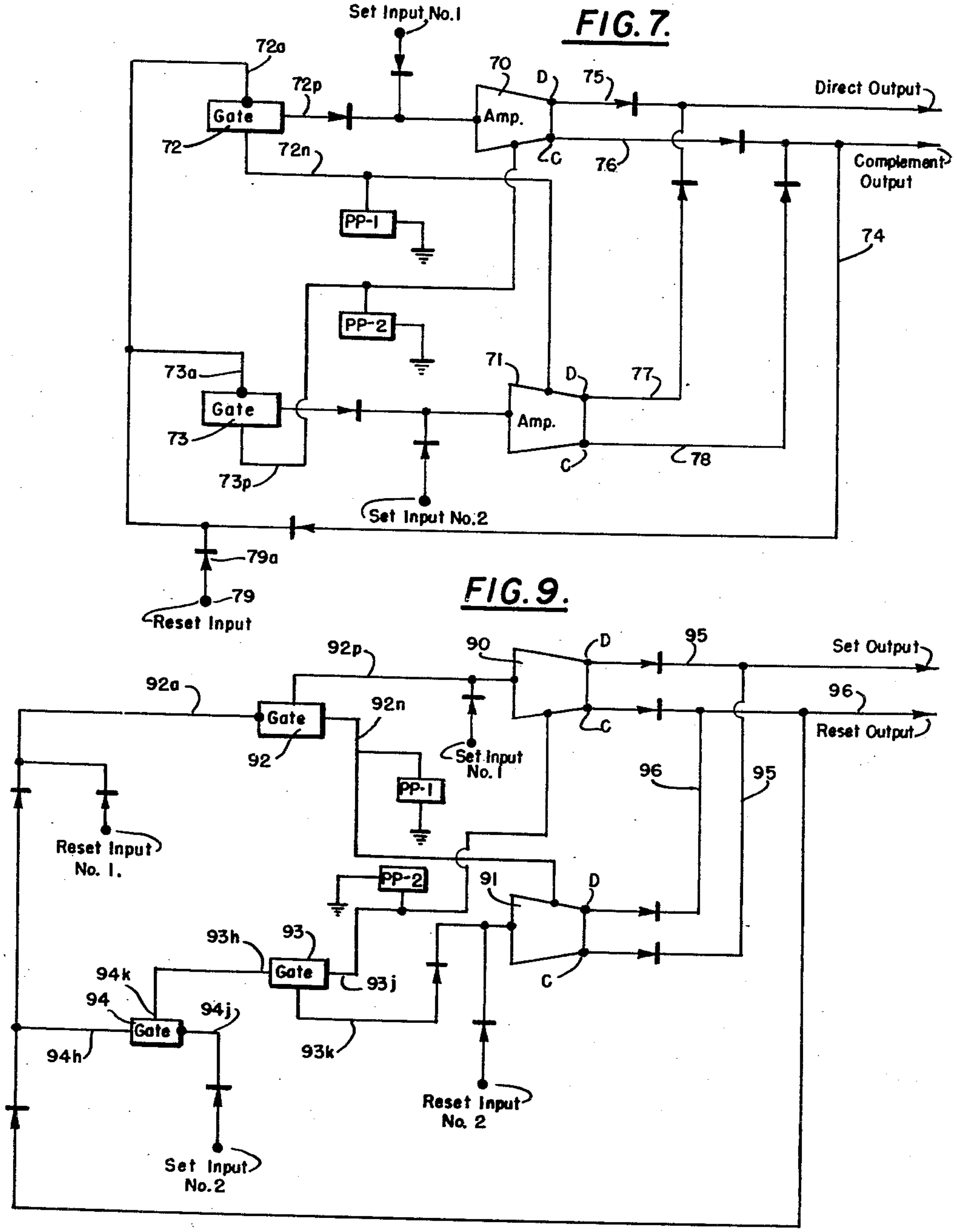
Figure 7 is a block diagram of a modified form of the invention.
Figure 9 is a block diagram of a modified form of the invention.

Figure 7 is a block diagram of a modified form of the invention in which the feedback path 74 is connected to the complement output instead of to the direct output. In order to carry out the invention in this way, certain changes are required in connecion with the set and reset inputs and the gates 72 and 73, but otherwise the principle of operation is essentially the same. In this case, the gates 72 and 73 which correspond to gates 41 and 42 of Figure 4 are inhibiting gates, that is they allow any pulses from the sources PP–1 or PP–2, as the case may be, to readily flow through the gates but block the flow of that current in event the input 72A or 73A, as the case may be, of the gate has a pulse thereon. In Figure 7 the two set inputs can be connected together to form one input if this be desirable; however, they are shown and described as separate inputs. The mode of operation of Figure 7 may be described as follows. Assuming there is no input at either of the set inputs, the pulses from source PP–1 will flow through amplifier 71 to complement output 78 thereof. This pulse will be fed back through feedback path 74 to the input 72A of gate 72 and will occur at that gate at the same time a pulse is received by that gate directly from source PP–1. Due to the construction of this gate there will be no output therefrom and consequently no input to amplifier 70 which will allow the next pulse from source PP–2 to flow to complement output 76 of amplifier 70 and from there it will flow through feedback path 74 to the input 73A of gate 73 and thus inhibit that gate from passing a pulse coming to that gate directly from the source of PP–2 at the same time period. Consequently, there will be no input to amplifier 71 and the next pulse from source PP–1 will flow therethrough to the complement output 78 and the cycle will repeat itself. Hence, there will be outputs on wires 76 and 78 which will merge together to form a single continuous complement output and there will be no outputs on wires 75 and 77. If now, during the spaces between two of the pulses of source PP–2, a signal is received at set input No. 1, magnetic amplifier 70 will not produce a complement output in response to the next pulse from source PP–2 but will produce a direct output on wire 75 therefrom. Since no complement output appears at wire 76 during the period of pulse PP–2, there will be no input at 73A at this same time period, and consequently the pulse from source PP–2 which failed to appear at output 76 will flow through the gate 73 to the input of amplifier 71, causing its complement output 78 to be stopped and producing an output pulse on wire 77. Since there is no output on 78 there will be no pulse fed back through wire 74 and the potential at both inputs 72A and 73A will be zero. Therefore, pulses from source PP–1 will readily flow through gate 72 and reset the core of magnetic amplifier 70 during the spaces between power pulses of source PP–2. Likewise, pulses from source PP–2 will readily flow through gate 73 to the amplifier 71 and reset the core thereof during the spaces between pulses of source PP–1. Consequently, the complement outputs on wires 76 and 78 of both amplifiers will remain at zero potential and the direct outputs on wires 75 and 77 will contain pulses according to the positive excursions of sources PP–2 and PP–1 respectively. The pulses on direct outputs 75 and 77 will combine to form a single continuous direct current of direct output 77. This condition will continue until a reset input pulse appears at the reset input 79. Such a pulse will flow through the rectifier 79A to the inputs 72A and 73A of the gates 72 and 73, raising those inputs to high positive values. This will cut off both gates and stop the flow of pulses from the sources PP–1 and/or PP–2 to their respective inputs of amplifiers 70 and 71 so that the cores of these amplifiers are no longer reverted during the spaces between power pulses. Therefore, the direct outputs from amplifiers 70 and 71 will be stopped and the complement outputs 76 and 78 will be resumed. Hence, the device has been reverted to its first stable state. Set input No. 2 functions in very much the same way as does set input No. 1.

Figure 8:
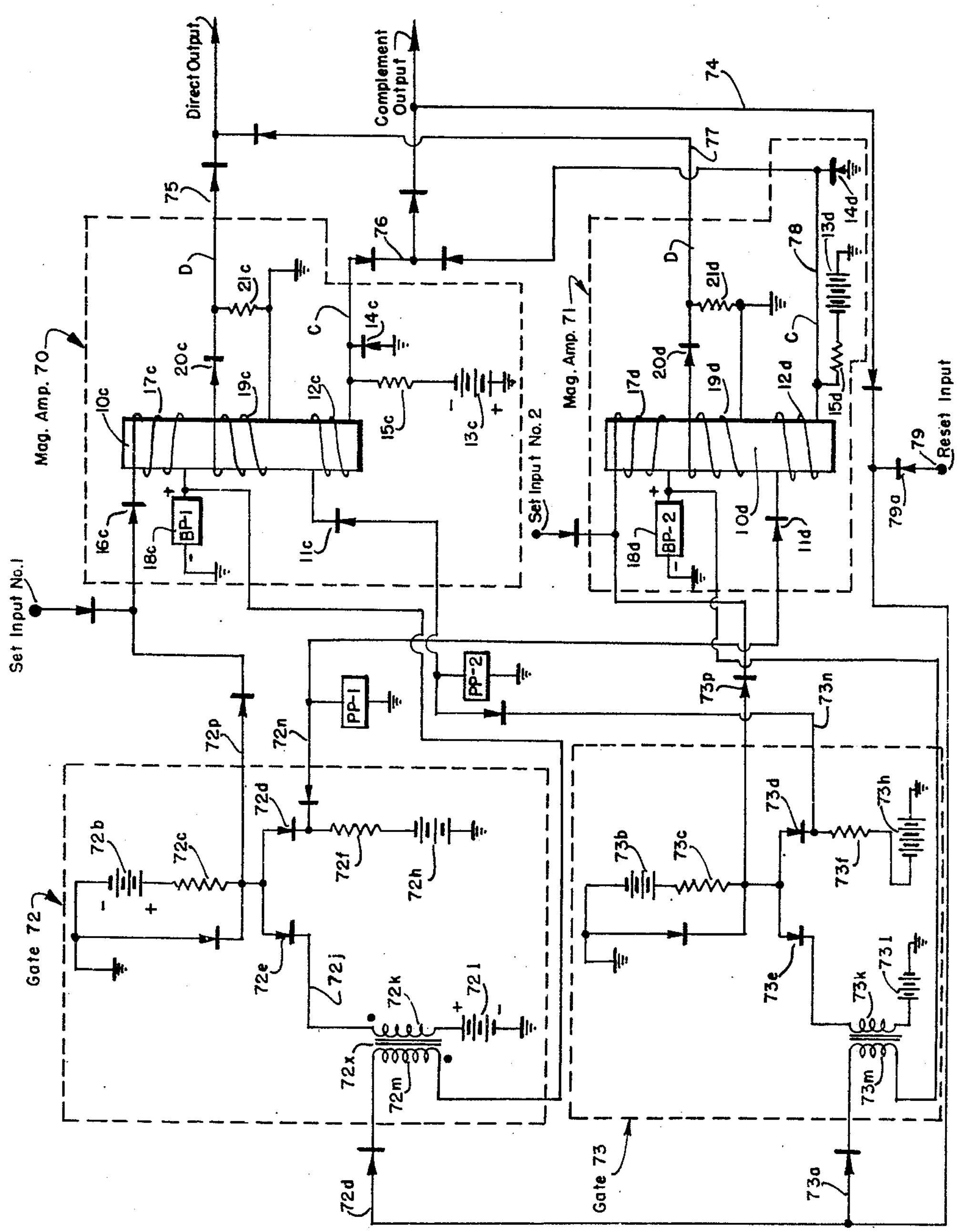
Figure 8 is a schematic diagram of the device of Figure 7.

Figure 8 is a schematic diagram of the device shown in Figure 7. The magnetic amplifier 70 is shown the same as the magnetic amplifier of Figure 1 and bears like reference numbers, except that the subscript C has been added. Likewise, the magnetic amplifier 71 of Figure 8 is the same as that of Figure 1, except that the subscript D has been added. The gates 72 and 73 are shown in more detail, and since they are identical and explanation of one will serve as an explanation of the other, it being apparent that similar parts on the two gates bear similar subscripts. For example, part 72F of gate 72 corresponds to part 73F of gate 73. In the absence of a pulse at both of inputs 72A and 72N, the operation is as follows. Current flows from battery 72B through resistor 72C, rectifier 72D, resistor 72F, battery 72H, to ground. The potential drop of battery 72B appears across resistor 72C and the potential of battery 72H appears across resistor 72F, and therefore output wire 72P is at ground potential. No current flows through rectifier 72E since the positive potential of battery 72L is impressed through secondary winding 72K of the transformer upon wire 72J and this positive potential cuts off rectifier 72E. If it now be assumed that a pulse appears on wire 72N, it will raise the potential of the cathode of rectifier 72D and then both rectifiers 72E and 72D will be cut off and current will flow from battery 72B, resistor 72C, wire 72P, rectifier 16C, input winding 17C, blocking pulse generator 18C, to ground. Since the blocking pulse generator has no signal during the periods that source PP–1 is going positive, the blocking pulse generator will not oppose the flow of current from the battery 72B. Consequently, in response to each positive pulse of source PP–1, there will be a flow of current from battery 72B through coil 17C, assuming that there is no input at 72A. If it now be assumed that an input pulse appears at wire 72A concurrently with a positive going pulse of source PP–1, the result will be as follows. A pulse on input 72A flowing through primary 72M will induce a potential in secondary 72K which will be equal and opposite to that of battery 72L, hence the two potentials will cancel each other and the wire 72J will no longer be raised to a positive value by battery 72L. Hence, current will now flow from battery 72B, resistor 72C, rectifier 72E, winding 72K, and battery 72L, to ground. The potential of battery 72B will appear across resistor 72C and the potential of battery 72L will appear across the winding 72K, and therefore the output wire 72P will be at ground potential. The connection of the lower end of primary 72M to blocking pulse generator 18C permits core 72X of the transformer to recover in the presence of a continuous signal at input 72A.

It is possible, therefore, to summarize the mode of operation of the conventional inhibiting gate 72 by stating that when input 72N is energized in the absence of a pulse on input 72A, current will flow from the battery 72B through the input winding 17C. When an input pulse appears at input 72A, it will effectively cancel the biasing effect of battery 72L and the cathode of rectifier 72E will no longer be cut off and current will now flow from battery 72B through winding 72K and battery 72L, lowering the potential of wire 72P to ground.

If the device is assumed to be in its original off position and the two cores 10C and 10D are assumed to be at points 23 on their respective hysteresis loops, and if no inputs have appeared at set input No. 1 or set input No. 2, the operation will be as follows. The first power pulse from PP–1 will find coil 12D with low impedance and will flow through wire 78 to the complement output. This pulse will be fed back through feedback means 74 to the input 72A where it will inhibit an output at 72P and therefore the core 10C will not be reset. The next pulse from source PP–2 will find coil 12C with low impedance and will flow to output 76 and also through feedback path 74 to input 73A. That pulse will inhibit any output at 73P and consequently the core 10D will not be reverted and the next pulse from source PP–1 will find a low impedance path through coil 12D to the output 78 and the cycle of operation will repeat itself until a set input pulse is received. The apparatus may be shifted into its other stable state if either of the following events occurs: (1) a pulse on set input No. 1 during the spaces between two positive pulses of source PP–2, or (2) a pulse on set input No. 2 during the spaces between the positive pulses of source PP–1. If the first of these is assumed to take place, the set input pulse will revert the core 10C during spaces between two positive pulses of source PP–2, stopping the complement output at 76 and producing a direct output at 75. Since there is no complement output at 76 at this particular time period, there will be none at input 73A during the last mentioned positive pulse of source PP–2 at 73N and consequently there will be a pulse on gate output 73P flowing through coil 17D to thereby revert the core 10D during the spaces between two of the power pulses of source PP–1. Hence, coil 12D will present high impedance to the next pulse from source PP–1 and the latter will not appear at complement output 78 but there will be instead a direct output at 77. In view of the lack of a signal at output 78, there will be no feedback via 74 concurrently with the last-named pulse of source PP–1, and consequently no pulse at 72A to inhibit the effect of said last-named pulse of source PP–1 on input 72N and therefore there will be an output at 72P which will flow through winding 17C and revert the core 10C thus inhibiting the next pulse from source PP–2 from flowing through coil 12C and producing an output at 76. Consequently, the apparatus will be in its second stable state in which there will be output pulses on wires 75 and 77 that will combine to form a continuous positive output pulse in the "direct output" and there will be no output in the "complement output." There will be no feedback through path 74 and both inputs 72A and 73A will be de-energized and consequently whenever a positive power pulse from source PP–1 occurs, it will actuate the gate to cause an output at 72P. Similarly, whenever a pulse from source PP–2 goes positive, it will actuate the input 73N of gate 73 and produce an output 73P. It follows that both cores will be reverted during the spaces between power pulses fed to their power windings 12C and 12D and consequently there will be no outputs at 76 and 78 but there will be outputs at 75 and 77.

The device may be reset by passing a positive reset current into input 79 and through rectifier 79A. This will raise the potential of inputs 72A and 73A so that the next pulse from source PP–1 or PP–2, as the case may be, will be inhibited from producing an output at 72P or 73P, as the case may be, so that the core 10C or 10D, as the case may be, will not be reverted.

If it be assumed that the reset input pulse at 79 occurred concurrently with the positive pulse of source PP–1, the application of the reset pulse to input 72A will inhibit an output at 72P and the core 10C will not be reverted, and the next pulse from source PP–2 will flow through coil 12C with low impedance and an output pulse will appear at 76 which will flow through feedback path 74 to input 73A and inhibit the pulse from source PP–2 from producing an output at 73P. Hence, core 10D is not reverted and the next pulse from source PP–1 will flow through coil 12D to output 78, so that the apparatus has now been shifted to its first-named stable state and will continue in that situation until one or the other of set inputs No. 1 and No. 2 is energized at a proper time.

In the device of Figure 4 the feedback circuit was connected to the "direct output." In the device of Figure 7, the feedback path was connected to the "complement output." In the device of Figure 9 there is another connection for the feedback path. In this figure, the direct output and the complement outputs of the amplifiers 90 and 91 are cross-connected, that is, the direct output of amplifier 90 is connected to the complement output of the amplifier 91. Magnetic amplifiers 90 and 91 are identical with the magnetic amplifier of Figure 1. The gates 92 and 94 are identical with the gate 72 of Figure 8, and the gate 93 is identical with the gate 41 of Figure 6. Referring first to gate 92, it has an output at 92P whenever there is a positive pulse on input 92N, in the absence of a positive pulse at input 92A. In other words, a pulse at input 92A inhibits a pulse at 92N from appearing in the output 92P.

Gate 93 has inputs 93H and 93J which when concurrently energized, produce an output at 93K, otherwise there is no output at 93K.

Gate 94 has inputs 94H and 94J and an output 94K. When a pulse appears at input 94H in the absence of a pulse at input 94J, the gate has an output at 94K, otherwise there is no output at 94K. A pulse on input 94J inhibits any output at 94K.

The set input No. 1 and set input No. 2 of Figure 9 may be interconnected to form a single set input. Similarly, the two reset inputs may be connected together. If it be assumed that one or both set inputs are temporarily energized, the operation of the device will be as follows. When the next positive going excursion of source PP–2 occurs, it will flow to amplifier 90 and, since this amplifier has an input thereto due to the set input signal on set input No. 1, there will be a direct output at D which appears at set output 95. There will be no output at C and hence nothing at reset output 96. The next positive going excursion of source PP–1 will pass to amplifier 91 and since there is no signal at the input of this amplifier, it will have a complement output which will pass to set output 95. There will be direct output from amplifier 90 and hence there will be no signal on reset output 96. It may be assumed that by this time the signal at set input No. 1 (as well as at set input No. 2, if there was one) has terminated. However, the apparatus will continue to remain in the aforesaid first stable state wherein there is a signal at set output 95 and no signal at reset output 96. The reason for this follows. Since there was no signal at reset output 96, there was no input at 94H to gate 94 and no input at 92A to gate 92. Consequently, there is no output at 94K from gate 94 and therefore no input at 93H to gate 93. Therefore no output will appear at 93K from gate 93 and no further control signals will be fed to the amplifier 91. Therefore the next positive excursion of source PP–1 will cause a complement output on wire 95 from amplifier 91. That same positive going excursion will, however, flow to input 92N and thence to output 92P of gate 92, since there is no signal at input 92A. Consequently there will be a control input on wire 92P for amplifier 90 which will cause this amplifier to produce only direct outputs and no complement outputs. Therefore the output of amplifier 90 will appear on set output 95 and there will be no output on reset output 96. It follows that there will continue to be no feedback on wires 92A and 94H and consequently the device will continue in the aforesaid first stable state with a set output at 95 and no reset output at 96.

If it now be assumed that a signal appears at either or both of the reset inputs, the device will shift to a second stable state in which there is no signal at set output 95 but there is a signal at reset output 96. For example, assume that a signal appears at reset input No. 2. It will cause the next positive excursion of source PP–1 to flow to the direct output D of amplifier 91, producing a signal on reset output 96 which is fed back to wires 92A and 94H. Since there is no signal at set input No. 1, the current fed back from 96 to 94H will pass to input 93H of gate 93 thus inhibiting flow of pulses through gate 92. Hence there will be no input on 92P to amplifier 90 and the next positive excursion of source PP–2 will produce a complement output from amplifier 90 and consequently a signal at reset output 96. The latter signal will be fed back to input 94H of gate 94. Since there is no signal at set input No. 2, the signal on 94H will pass through gate 94 to output 94K and thence to input 93H of gate 93. It will occur concurrently with the last-mentioned positive excursion of source PP–2, which is impressed on input 93J. Consequently the gate 93 has both its inputs energized and will therefore produce an output at 93K which is fed to the control input of amplifier 91, causing the next positive going excursion of source PP–1 to flow to the direct output D of amplifier 91 and thence to the reset output 96. This second stable state in which there is no signal at set output 95 and a signal at reset output 96 will continue until another signal is received at set input No. 1 or set input No. 2 or at both of said set inputs. In response to energization of one or more of the set inputs, the apparatus will shift back to its first stable state in which there is a set output at 95 and no reset output at 96.

Figure 10:
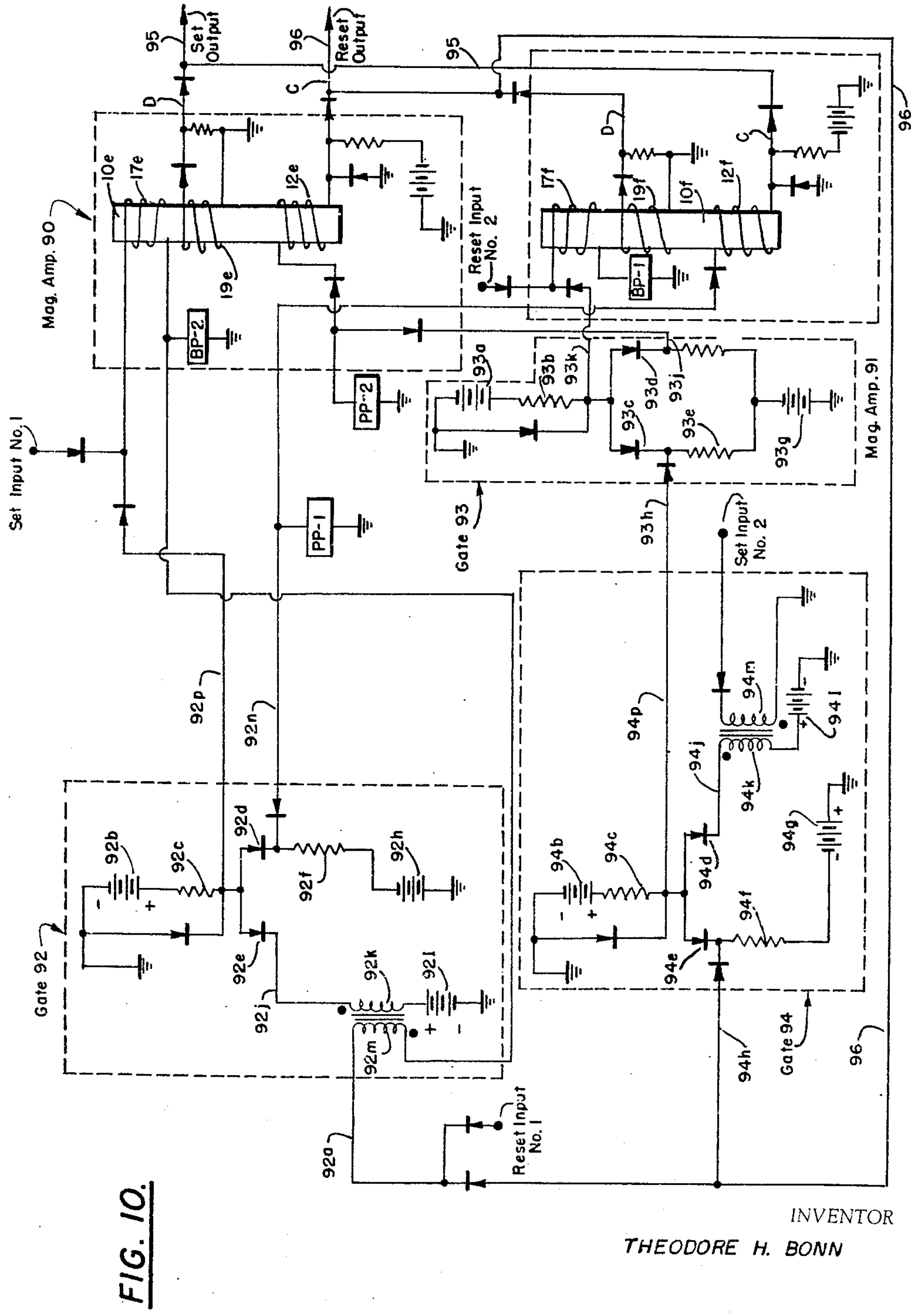
Figure 10 is a schematic diagram of the device of Figure 9.

The relationship of the potentials produced by generators PP–1, PP–2, BP–1 and BP–2 of Figure 10 are shown in Figure 5. Figure 10 is a schematic diagram of Figure 9, the operation of which is as follows. Assume that the device is in its first stable state in which there is a signal at set output 95 and no signal at reset output 96. In this case there will be no feedback on wires 92A and 94H. Therefore battery 92L will cut off rectifier 92E. During positive going excursions of source PP–1, the pulses therefrom will flow through wire 92N and cut off rectifier 92D. Therefore the positive end of battery 92B is connected through resistor 92C and wire 92P to control coil 17E of magnetic amplifier 90. At this instant blocking pulse generator BP–2 has zero potential and therefore allows the current from battery 92B to return to ground and thence to the negative side of that battery. Since there is no signal on wire 94H, current may now flow from ground through battery 94B, resistor 94C, rectifier 94E, resistor 94F and battery 94G to ground. The potential of battery 94B appears across resistor 94C and the potential of battery 94G appears across the resistor 94F, hence wire 94P is at substantially ground potential and there is no input on wire 93H of gate 93. Hence current flows in that gate from ground through battery 93A, resistor 93B, rectifier 93C, resistor 93E, battery 93G, to ground. The potential of battery 93A appears across resistor 93B and the potential of battery 93G appears across resistor 93E, leaving output wire 93K at ground potential and consequently control winding 17F is not energized. Consequently the core 10F of amplifier 91 is not reverted during the spaces between power pulses and the next positive excursion of source PP–1 finds coil 12F with low impedance and flows readily therethrough to output C and thence to set output 95. Since the core remains saturated during this operation, there is no potential induced in winding 19F and no signal on direct output D or reset output 96. The coil 12E of amplifier 90 will have high impedance since during positive excursions of source PP–1 the coil 17E will be energized to drive the core in one direction, and positive excursions of source PP–2 will pass through coil 12E and drive the core in the opposite direction. Consequently, the core will operate on unsaturated portions thereof, giving coil 12E high impedance and preventing current flow therethrough to output C. Potential will, however, be induced in coil 19E and will appear at output 95.

Assume now that a positive signal appears at reset input No. 1, the reset signal current will now flow through primary 92M during the zero half cycle of blocking pulse generator BP–2. This is the same interval that source PP–1 goes positive. The flow of current through primary 92M will induce potential in the secondary 92K which is equal and opposite to the potential of battery 92L and consequently the lower end of resistor 92C is effectively grounded. On the other half cycle of source BP–2, the wire 92P is also effectively grounded since the source PP–1 then goes negative and the rectifier 92D is no longer cut off. On this half cycle the potential of battery 92B appears across resistor 92C and the potential of battery 92H appears across resistor 92F and therefore the intermediate point to which wire 92P is connected is at substantially ground potential. Consequently, current no longer flows through input winding 17E. It follows that potential is no longer induced in coil 19E and there is no signal at set output 95. The only magnetizing force on the core 10E results from flow of current from source PP–2 through coil 12E and this saturates the core giving the coil 12E low impedance and permits the positive excursions of source PP–2 to appear at reset output 96. This potential is fed back to inputs 92A and 94H. When it appears at 94H it cuts off rectifier 94E. Rectifier 94D is also cut off at this time due to battery 94L (assuming there is no signal at set input No. 2) and therefore the full potential of battery 94B appears on wire 94P and at the input 93H of gate 93. Rectifier 93C is therefore cut off. This all occurs during a positive going excursion of source PP–2 and at that time rectifier 93D is also cut off since it is connected to the source PP–2. Therefore substantially the full potential of battery 93A appears on wire 93K and flows through coil 17F, blocking pulse generator BP–1 to ground. At this time BP–1 has zero potential across it, as shown in Figure 5. The flow of current through coil 17F induces potential across coil 19F and therefore produces potential at the reset output 96. Said flow of current through coil 17F magnetizes the core 10F in one direction and the next positive excursion of source PP–1 magnetizes it in the opposite direction and therefore coil 12F has high impedance and very little current appears at the complement output C during this stable state. The potential appearing across coil 19F appears on feedback path 96 and at input 92A of gate 92. Current therefore flows through coil 92M and induces potential across secondary 92K which cancels the potential of battery 92L and therefore effectively grounds the lower end of resistor 92C thus dropping wire 92P to ground potential and therefore continues to prevent flow of current through coil 17E. It follows from the foregoing that the device will remain in its second stable state wherein there is a signal at reset output 96 but no signal at set output 95. The device may be returned to its first stable state by energizing one or more of the set inputs. If set input No. 1 is energized it will cause a flow of current through coil 17E that will induce a potential in coil 19E giving a direct output at 95 and resetting the core so that the next pulse from source PP–2 will not flow to the reset output 96. The absence of a current at reset output 96 will prevent any output from the gate 94 and hence there will be no output from the gate 93 and no flow of current through coil 17F. Hence there will be no potential induced in coil 19F but coil 12F will have low impedance to pulses from source PP–1.

Assuming the device is in the aforesaid second stable state and it is desired to return it to the first stable state by energizing set input No. 2, the operation is as follows. A positive signal on set input No. 2 will cause flow of current in primary 94M which will induce a potential across secondary 94K equal and opposite to the potential of battery 94L. This effectively grounds wire 94P preventing any input on wire 93H to gate 93. Hence wire 93K drops to ground potential and no current flows through coil 17F. This prevents induction of potential in secondary 19F and renders coil 12F with low impedance. Hence there is a signal on set output 95 but none on reset output 96. The absence of a signal at this time on feedback path 96 causes gate 92 to apply full potential on wire 92P, thus energizing coil 17E, inducing potential across winding 19E and producing a signal at set output 95. However, coil 12E will have high impedance to pulses from source PP–2 and hence there will be no signal in the reset output 96.

In the foregoing description, Figure 1 was an illustration of one type of magnetic amplifier suitable for use in the invention. The invention is, however, not limited to circuits employing that form of magnetic amplifier, as there are a variety of others which could be used, and Figures 11 and 13 are examples of such other forms of magnetic amplifiers.

Figures 11, 12, 13, 14:
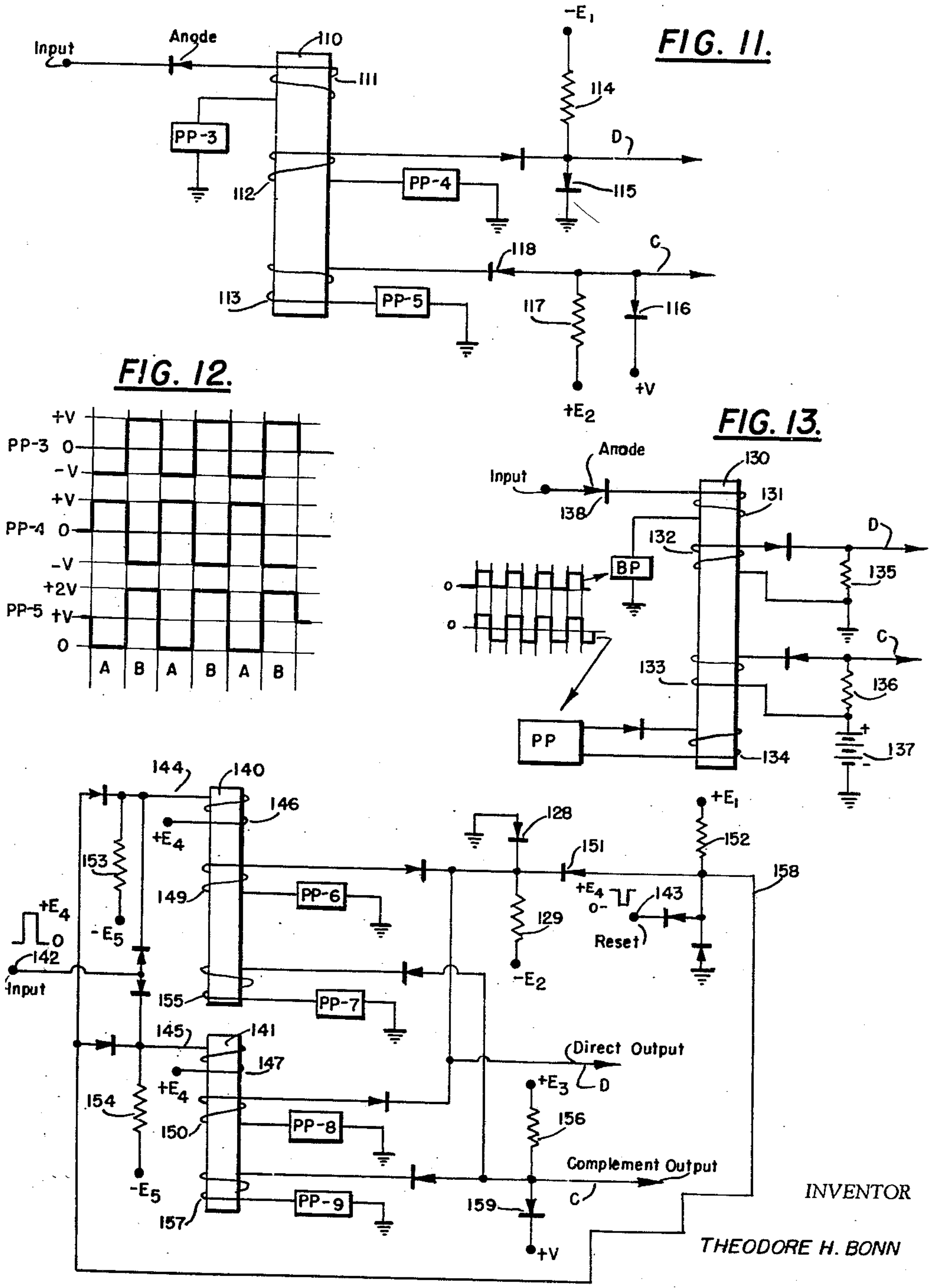
Figure 11 is a schematic diagram of a modified form of magnetic amplifier that may be employed in connection with the invention.
Figure 12 is a timing diagram showing the waveforms applicable to Figure 11.
Figure 13 is a schematic diagram of another modified form of magnetic amplifier that may be used in connection with the invention.
Figure 14 is a schematic diagram of a flip-flop circuit embodying the the magnetic amplifier of Figure 11.

In Figure 11, there is a core 110 having an input coil 111, a direct output coil 112 and a complement output coil 113. There are three power pulse generators PP–3, PP–4 and PP–5 which have relative waveforms as shown in Figure 12. These waveforms have been broken up into two groups of time intervals, A and B, for reference purposes. In connection with the direct output circuit D, there is a sneak suppressor including resistor 114 and rectifier 115, in combination with the source of potential of $-E_1$ volts. In connection with the complement output C, there is a sneak suppressor including a rectifier 116 connected to a source of positive potential of +V volts. Rectifier 116 limits the complement output C to a potential of +V volts. The current for the complement output C is supplied by a source of potential at $+E_2$ volts, connected to one end of resistor 117. When the winding 113 has low impedance, current from source $+E_2$ flows through resistor 117, rectifier 118, winding 113, source PP–5 which has low impedance, to ground; and hence, there is substantially no potential on the complement output C, all of the potential of source $+E_2$ appearing across resistor 117. On the other hand, when winding 113 has high impedance, current from source $+E_2$ appears at complement output C, but is limited to the lower potential of source $+V$ by reason of the rectifier 116.

If it now be assumed that no pulses appear at the input, the core will be driven from minus remanence to plus remanence during each time period A by virtue of the positive pulse from source PP–4 flowing through coil 112 to direct output D and the negative pulse from source PP–5 flowing through coil 113 to complement output C. During time intervals B, the core will be reverted to negative remanence by reason of pulses from source PP–3 flowing through coil 111, thence through the low impedance input to ground. This current flow through coil 111 induces flux in the core 110 in opposite direction to the flux induced in the core by the coil 112, when positive pulses of source PP–4 flow through the latter.

Hence, in the absence of an input, the core will repeatedly traverse the non-saturated portions of its hysteresis loop, coils 112 and 113 driving it up the loop and coil 111 driving it down the loop, and hence there will be very little output at D. What output current does flow through coil 112 is insufficient to overcome the negative potential of source $-E_1$ and, as has been stated, that source together with resistor 114 and rectifier 115 constitutes a sneak suppressor which cancels the sneak current flowing through coil 112 when the core is operating on unsaturated portions. Hence, in the absence of an input, there is practically no output at D. However, since the coils on the core have high impedance during the circumstances just mentioned, coil 113 likewise has high impedance and therefore does not shunt current from source $+E_2$ to ground. Instead, the source $+E_2$, acting through resistor 117, places a potential of $+V$ on the complement output. Hence, there is a complement output but no direct output.

If a positive pulse appears at the input during a positive excursion of source PP–3 (in one of the B intervals), flow of current in coil 111 will be prevented thereby, the core will not be driven to negative saturation by the coil 111, and hence, the next pulse from source PP–4 flowing through the coil 112 will drive the core from positive remanence to positive saturation, and a large current will flow in the direct output D. Since the core is saturated during that time interval, coil 113 has low impedance and it effectively connects the upper end of resistor 117 to ground, and therefore there is no complement output at C.

In other words, in the absence of an input, there will be a complement output at C and no direct output at D; whereas if there is an input there will be a direct output at D but no complement output at C.

Figure 13 is a schematic diagram of another form of magnetic amplifier that may be used in conjunction with the block diagrams of Figures 4, 7 and 9. In Figure 13 the core 130 has input coil 131, direct output coil 132, complement output coil 133, and power winding 134. When input pulses, which go positive during the negative excursions of source PP, appear at the input, they flow through coil 131 and tend to drive the core from positive remanence to negative remanence. During the positive excursions of source PP, the core 130 is driven from negative remanence to positive remanence. Hence, as long as the input pulses continue, they drive the core to negative remanence and the core is driven to positive remanence during the spaces between input pulses. Since all of this happens on unsaturated portions of the hysteresis loop, potentials are induced in coils 131, 132 and 133. No current, however, flows in coil 131, due to the change of flux resulting in coil 134, since during these positive excursions of source PP the positive excursions of blocking pulse generator BP are applied to the cathode of input rectifier 138 and cut off that rectifier. The potential induced in coil 132 due to current flow in 134 appears across output resistor 135 and flows to the direct output D. The potential induced in coil 133 due to current flow in 134 appears across resistor 136 and is substantially equal and opposite to the potential of battery 137; hence there is no complement output at C.

When no input is supplied to the device, no current flows in coil 131. Hence, successive pulses from source PP, flowing through coil 134, drive the core 130 to saturation and no potentials are induced in coils 132 and 133. Hence, there is no output at D. Since the coil 133 no longer produces a potential across resistor 136 which is equal and opposite to the potential of battery 137, substantially the full potential of battery 137 appears at complement output C.

Figure 15:
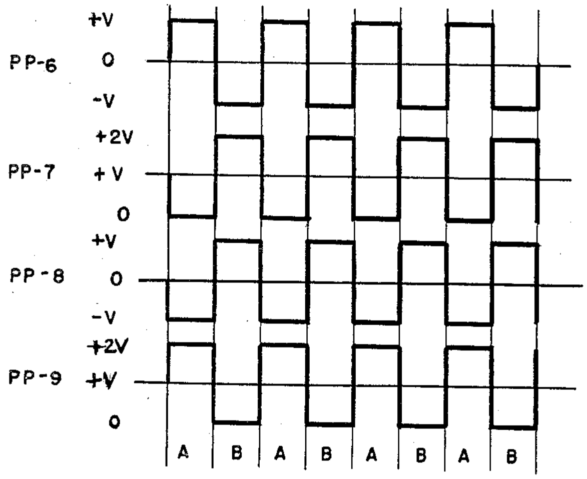
Figure 15 is a timing diagram for the power pulse generators PP–6 to PP–9 inclusive of Figure 14.

Figure 14 is a circuit diagram showing how the magnetic amplifier of Figure 11 may be placed in the block diagram of Figure 4. In Figure 14 there are four power pulse generators, PP–6 to PP–9 inclusive, which have waveforms as shown in Figure 15. There are two cores 140 and 141 substantially the same as shown in connection with Figure 11 and having coils for performing the same function as the coils on the cores of Figure 11. There is a set input 142 and a reset input 143 for the device. Assume that a pulse of potential $+E_4$ appears at the input 142 and thereby moves the wires 144 and 145 to positive values. In this case no currents flow in coils 146 and 147. If the input pulse occurred at one of the time periods A of Figure 15, the positive pulse from source PP–6 occurring at that time would drive the core 140 to positive remanence and the next pulse during time period B, from source PP–8, flowing through coil 150 would drive the core 141 from positive remanence to saturation. Since at time period B, coil 150 would have low impedance, the current from source PP–8 would readily flow through that coil. The source PP–8 would immediately raise the cathode of rectifier 151 to a potential of $+V$ and thus cut off that rectifier. Thereupon, assuming no reset pulse at 143, the potential of source $+E_1$ cooperates with the two sources $-E_5$ to cause a flow of current from source $+E_1$, resistors 152, 153 and 154 to sources $-E_5$. The relative values of source $+E_1$, resistors 152 to 154 inclusive and sources $-E_5$ are such that the current flowing in this path leaves the wires 144 and 145 at the potential of approximately $+E_4$, so that no current will now flow in coils 146 and 147. Hence, the next pulse from source PP–6, occurring at time period A, flows through coil 149 which has low impedance and drives core 140 from remanence to saturation. This pulse again applies a high positive potential to the cathode of rectifier 151 and cuts off this rectifier so that again the potential of source $+E_1$, less the drop in resistor 152, appears on wires 144 and 145 and places a potential on those wires equal to $+E_4$, and again prevents flow of current in coils 146 and 147. The next positive pulse from source PP–8, occurring during time period B drives core 141 to saturation so that coil 150 has low impedance and that pulse is applied to the cathode of rectifier 151 and cuts it off so that the potential of source $+E_1$ is again impressed on wires 144 and 145 and continues to prevent flow of current in coils 146 and 147. During all of the foregoing operations, the cores 140 and 141 were substantially saturated by the positive excursions of source PP–6 and PP–8, and hence, the coils on those cores had low impedance during said positive excursions respectively. In other words, during the positive excursions of source PP–6, the coil 155 had low impedance. At the same time source PP–7 had zero potential and therefore current passed from source $+E_3$ through resistor 156, coil 155, source PP–7, to ground. The impedance of coil 155 together with that of source PP–7, being small compared to that of resistor 156, caused substantially all of the potential of source $+E_3$ to appear across resistor 156 and hence, the complement output C had no potential thereon. During the alternate intervals when source PP–8 was going positive and was driving core 141 to saturation, the coil 157 had low impedance. Likewise, at this time source PP–9 had low impedance and was at ground potential so that in effect the complement output wire C was effectively grounded through coil 157 and source PP–9, and substantially all of the potential of source $+E_3$ appeared across resistor 156. Hence, during all of the foregoing operations there was substantially no output on complement output wire C. On the other hand, the alternate sources PP–6 and PP–8 were alternately supplying large positive pulses through low impedance coils 149 and 150 to the direct output D. Hence, there was a direct output at D but no complement output at C.

If it now be assumed that a reset signal appears at input 143, the operation will be as follows: normally the reset input 143 is held at a potential of $+E_4$ and when a reset signal is applied to the device the reset input drops to ground potential. When this occurs, the wire 158 is immediately grounded. Thereupon the two sources $-E_5$ lower the wires 144 and 145 to ground potential and current flows from sources $+E_4$ through coils 146 and 147 respectively to the wires 144 and 145 which are at ground potential. Hence, there is a reverse current flowing through coils 146 and 147 which tends to drive these cores negatively. It makes no difference whether the reset signal appears at time period A or time period B. However, for purposes of illustration, it will be assumed that it occurs at time period A. If it were not for this reset pulse, direct output due to the source PP–6 at time period A would be fed back via wire 158 to keep core 141 at saturation; but the effect of source PP–6 is prevented by the reset input pulse. Hence, the reverting current in coil 147 will drive the core 141 to negative remanence, since no current is flowing from sources PP–8 or PP–9 at this time. During the next time interval B, the source PP–8 goes positive and will drive the core 141 along an unsaturated portion from minus remanence to plus remanence, whereupon coil 150 will have high impedance and no signal will appear at the direct output D. Since coil 157 will likewise have high impedance at this time, it no longer effectively grounds the wire C and the potential of source $+E_3$ will be impressed on the complement output C through the resistor 156. This potential will, however, be limited to the value $+V$ by the rectifier 159. Since the direct output has been stopped, the rectifier 151 is no longer cut off and current will now flow from source $+E_1$ through resistor 152, rectifier 151, resistor 129 to source $-E_2$. The source $-E_2$ has a negative value, and the resistors 129 and 152 are of such relative values that the wire 158 remains at about ground potential. The result is that wires 158, 144 and 145 are held at a potential low enough that reverting current from sources $+E_4$ will tend to flow through coils 146 and 147, tending to drive the cores from positive remanence to negative remanence during those intervals when the power pulses are not driving these cores. For example, during time period A the source PP–6 will tend to drive the core 140 from negative remanence to positive remanence, and during time period B the current flowing from source $+E_4$ through coil 146 will tend to drive the core 140 back to negative remanence. Likewise, during time period B, source PP–8 will supply current through coil 150 tending to drive the core 141 to positive remanence, whereas during time period A, the current from source $+E_4$ flowing through coil 147, will tend to return the core 141 to negative remanence. In all of these operations, the cores 140 and 141 will operate on unsaturated portions thereof, whereupon coils 149 and 150 will have high impedance, thus preventing sources PP–6 and PP–8 from supplying substantial current to direct output D; coils 155 and 157 likewise have high impedance wherefore the complement output C is not grounded but is held at a potential of $+V$ by virtue of the circuit $+E_3$—156—159 to $+V$. It follows that there is no direct output at D but there is a complement output at C. During this state of operation, there will be so-called sneak currents flowing through coils 149 and 150. In other words, when these cores have high impedance during the positive excursions of the power pulses PP–6 and PP–8, a small current will flow through these coils and would appear at the direct output D except for the sneak suppressor which comprises the parts: source $-E_2$, resistor 129, and rectifier 128. A current flows through the aforesaid sneak suppressor which is substantially equal to sneak current and until the sneak currents build up to a value in excess of the normal current that would flow through 128 and 129 in the absence of the sneak currents, there will be no direct current at the direct output D.

The apparatus will remain in this state until another positive pulse appears at the input 142 and it will have the same effect as the first pulse at that input and will cause the circuit to flip to its alternate state in which there is maximum current at direct output D and no current at complement output C.

Figure 16:
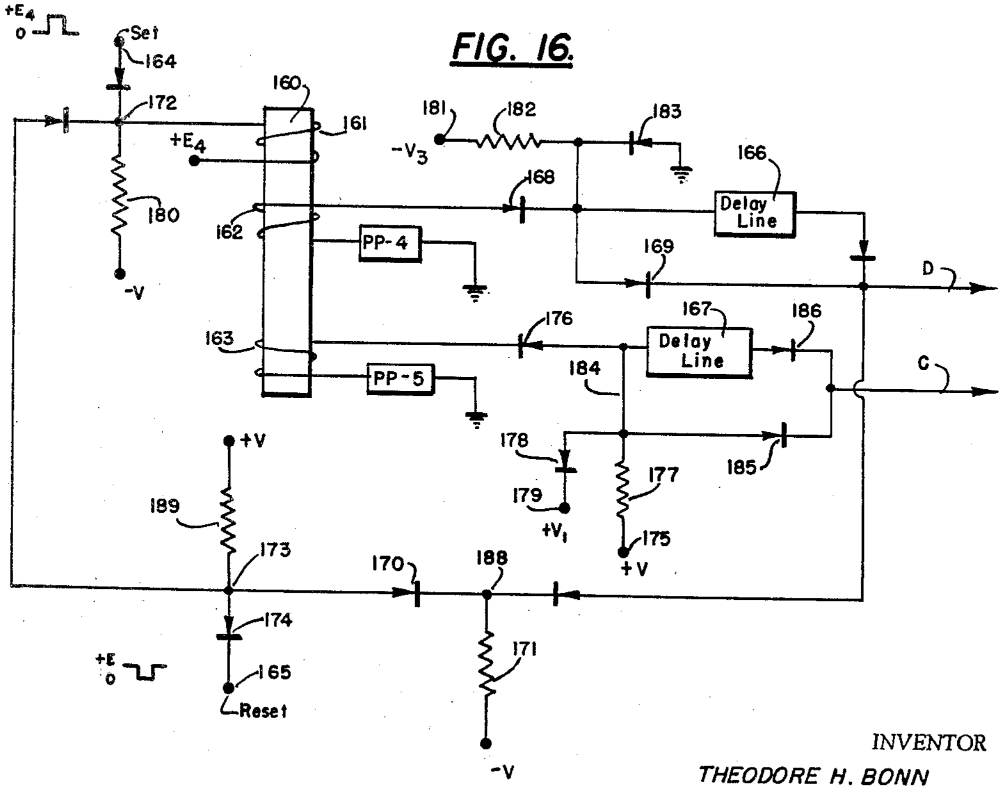
Figure 16 is a modified form of flip-flop circuit embodying the magnetic amplifier of Figure 11.

Figure 16 is a modified form of the invention and employs a single core 160, with coils 161, 162 and 163 which respectively perform the same functions as coils 111, 112 and 113 of Figure 11. The set input 164 is normally at zero potential, but receives positive pulses to set the device in one stable state. The reset input 165 is normally held at $+E$ during operation of the device, but is lowered to zero in response to a reset input signal, and when lowered to zero flips the device into its second stable state.

There are two generators of power pulses, PP–4 and PP–5, which have the same waveforms as the generators bearing the same designations shown in Figures 11 and 12. There are two delay lines 166 and 167 which provide delays equal to the time spacing of one of the intervals A or B of Figure 12. In other words, a pulse appearing at the input of delay line 166, and extending throughout the duration of time period A, would leave the delay line in the form of a pulse extending over the period B of Figure 12. The same may be said for delay line 167.

The set and reset signals are always timed to occur during one of the B time intervals of Figure 12. In the case of a reset signal, the foregoing means that the input 165 will be lowered to zero during a time interval B. The potential of source PP–4 is such that it passes a current through coil 162 which produces a magnetizing force sufficient to not only overcome the magnetizing forces due to any reverting currents that may be flowing in coil 161, due to source $+E_4$, but in addition to drive the core 160 from negative remanence to positive remanence. If it be assumed that the core is at positive remanence, as the result of such a power pulse, at the beginning of a time period B (see Figure 12), and if during such time period a positive pulse appears at input 164, the mode of operation will be as follows: the positive pulse at 164 being equal to the potential of source $+E_4$ will prevent a flow of current through input coil 161 so that the next positive excursion of source PP–4 occurring during the next A period, will flow through coil 162 and drive the core 160 from remanence to saturation. Hence, there will be a large output which will flow through rectifiers 168 and 169 to the output D. This same current being fed to the input of delay line 166 will be delayed and will occur at the direct output D during the B period as well as during the preceding A period. Hence, there will be a substantially continuous output at the direct output D. Prior to any signal on the direct output D, the wire 188 was held at ground potential by virtue of flow of current from source $+V$ through resistor 189, rectifier 170, resistor 171 to source $-V$. As a result, wires 172 and 173 were also held at ground potential. However, in response to the appearance of a positive pulse at direct output D, wire 188 is raised to a positive potential and rectifier 170 cut off so that the positive potential of source $+V$ is now impressed on wire 173; however, it is limited to the lower value $+E$ in view of the rectifier 174. Since wire 173 is at a positive potential, the wire 172 is also raised to a positive potential and both ends of coil 161 are at substantially the same positive potential. Therefore, the core is not reverted during this time period B, and the next pulse from source PP–4, occurring during a time period A, flows through coil 162 and drives the core to saturation and produces another pulse at output D. This pulse is also delayed through delay line 166, and continues to hold point 188 at a positive value and thereby continues to cut off rectifier 170. Therefore, wire 173 continues to remain at a positive value, as does wire 172, and current flow in coil 161 continues to be negligible.

In the first stable state there is no complement output at C for the following reason: the coil 163 always has low impedance, since the core 160 is always operating on unsaturated portions thereof. During the interval when source PP–5 is at zero potential, the wire 184 is effectively grounded through the rectifier 176, low impedance coil 163 and low impedance generator PP–5. Hence, the wire 184 is at ground potential. During the positive excursions of source PP–5 the cathode of rectifier 176 is cut off and source 175 would tend to raise the potential of wire 184 to the value $+V_1$, since the resistor 177, the rectifier 178 and the source 179 act as a limiter and limit the potential on wire 184 to $+V_1$. However, the potential on wire 184 may not rise to this value since it is definitely grounded during the A time intervals and if it should rise to a higher value during the B time intervals, the potential would be impressed on rectifiers 185 and 186 and thereby would also be impressed on the right-hand end of delay line 167. Since the left-hand end of delay line 167 is grounded during the A time intervals, the right-hand end of this delay line is effectively grounded during the B time intervals and therefore the current from source 175 will, during the B time intervals, flow through rectifier 185, rectifier 186, to the effectively grounded delay line 167. Hence, in the first stable state, substantially all of the potential of source 175 will appear across resistor 177 (during both of periods A and B) and there will be no complement output at C.

The potentials $+V$, $-V$, $+E$ and $+E_4$ are so related to each other and to the values of resistors 171, 168 and 180 that during the continuance of a direct output signal at D, the potential of wire 172 will be raised to substantially the value $+E_4$.

The second stable state of the circuit will now be explained. If it now be assumed that a reset signal appears which lowers the input 165 to ground potential, the wires 172 and 173 will likewise be lowered to ground potential, and reverting current will flow from source $+E_4$ through coil 161 tending to revert the core simultaneously with the occurrence of said reset signal, it being remembered that reset signals always occur during the B intervals. Therefore, during this B interval, the core will be reverted to minus remanence and the next positive pulse from source PP–4 will flow through coil 162 and drive the core from minus remanence to positive remanence. In this circumstance, coil 162 will have high impedance and therefore the current flow will be small. In fact it will be completely absorbed by the sneak suppressor which comprises the source 181, resistor 182 and rectifier 183, in the manner hereinabove described. Hence, there will be no current at direct output D, and the potential of wire 188 will be held at ground potential by virtue of the current flowing from source $+V$ through resistor 189, rectifier 170, resistor 171 to source $-V$. Wires 172 and 173 therefore drop to ground potential and reverting current continues to flow from source $+E_4$ through coil 161. This reverting current reverts the core during the B time periods, driving the core to negative remanence at the end of each one of said periods.

In the second stable state, during the A time periods, the source PP–4 supplies enough current to not only overcome the negative magnetizing force of coil 161 but in addition, enough to drive the core to positive remanence. Hence, the core, during this stable state of the apparatus, always operates along unsaturated portions thereof, whereby coils 162 and 163 have high impedance.

With this background, the way that complement output signals appear on wire C will be explained; assuming at first that the delay line 167 was not present and that there was an open circuit where that delay line now appears. In that situation, during the positive excursions of source PP–5, the cathode of rectifier 176 would be biased positively and the rectifier cut off, whereby the positive potential of source 175 would be applied to the output C; provided, however, that the resistor 177, the rectifier 178, and the source 179 would constitute a limiter and limit the potential at the output C to the value $+V_1$. During the periods when source PP–5 dropped to zero potential, the coil 163 will continue to have high impedance and the potential at output C will remain at the value $+V_1$. Since the potential on wire 184 remains at the steady value of $+V_1$, the addition of the delay line 167 does not change the mode of operation of the device and the potential at output C remains at $+V_1$ during both the A and B periods, the whole delay line 167, including both ends thereof, being raised to the potential of $+V_1$.

In the various figures of this application, batteries have been shown in order that the circuits may be readily followed but it is understood that in actual devices a single power supply could furnish all of the necessary potentials.

I claim to have invented:

1. A flip-flop circuit comprising a magnetic amplifier having a control input, a power input, a non-complement output and a complement output, a set input for controlling said first-named input, a source of spaced power pulses feeding the power input, feedback means from one of said outputs to the first-named input to effect recycling of the circuit, and reset means controlling the feedback circuit.

2. A flip-flop circuit comprising first and second magnetic amplifiers, each having a control input, a power input, a non-complement output and a complement output; means for feeding two trains of spaced power pulses to the two power inputs respectively with the pulses of one train occurring during the spaces between pulses of the other train; means combining the non-complement outputs; means combining the complement outputs; feedback means feeding one of said combined outputs to said control input to effect recycling of the circuit; a set input controlling said control input to place the circuit in one stable state; and reset input means for placing the circuit in its other stable state.

3. A flip-flop circuit comprising first and second magnetic amplifiers each having a control input, an input for receiving power pulses, a non-complement output and a complement output; first and second sources of spaced power pulses, each source producing its pulses during the spaces between pulses of the other source; said first and second sources respectively supplying pulses to the power pulse inputs of the first and second magnetic amplifiers; means for combining the two non-complement outputs; means for combining the two complement outputs; feedback means for feeding one of the combined outputs to said control inputs including first and second gates respectively controlling the flow of feedback to the first and second control inputs; the first gate also being controlled by pulses from the second source and the second gate being fed by pulses from the first source; each gate including means whereby it energizes its complementary control input under control of the feedback means in response to energization by the pulse source to which it is connected.

4. A flip-flop circuit as defined in claim 3 in which the feedback means is connected to the non-complement output.

5. A flip-flop circuit as defined in claim 3 in which the feedback means is connected to the complement output.

6. A flip-flop circuit as defined in claim 3 in which the feedback means is connected to the non-complement output, said input means including a set input for supplying a set input signal to one of the control inputs to start the circuit recycling and including a reset input for effectively interrupting the feedback in response to a reset signal.

7. A flip-flop circuit as defined in claim 3 in which the feedback means is connected to the complement output, said input means including a set input for supplying a set input signal to one of the control inputs to start the circuit recycling and including a reset input for adding a signal to the feedback means in response to a reset input signal.

8. An electrical circuit comprising first and second magnetic amplifier means, each having a control input, a power input for receiving power pulses, a non-complement output and a complement output; first and second sources of spaced power pulses respectively supplying pulses to the two power inputs, each of said sources producing its pulses during the spaces between pulses of the other source; means for combining the non-complement outputs of the first and second magnetic amplifier means; means for combining the complement outputs of the first and second magnetic amplifier means; and means including a feedback circuit responsive to the signals at one of said combined outputs, for controlling said control inputs whereby the circuit will recycle once a given signal flows in the feedback circuit.

9. An electrical circuit comprising first and second magnetic amplifier means, each having a control input, a power input for receiving power pulses, a non-complement output and a complement output; first and second sources of spaced power pulses respectively energizing said power inputs, each source producing its power pulses during the spaces between power pulses of the other source; means for combining the non-complement outputs of the first and second magnetic amplifier means; feedback means responsive to the combined non-complement outputs; a first gate which energizes the first control input when potentials concurrently appear on the feedback means and the second source; a second gate which energizes the second control input when potentials concurrently appear on the feedback means and the first source; and means whereby the control inputs of one of the magnetic amplifier means is energized so that there will be a signal in the non-complement output of that magnetic amplifier which will be fed to the control input of the other magnetic amplifier means to produce a signal in its non-complement output which will be fed back to the control input of said one magnetic amplifier means to effect recycling.

10. An electrical circuit as defined in claim 9 including reset input means for effectively interrupting the feedback.

11. An electrical circuit comprising first and second magnetic amplifier means, each having a control input, a power input for receiving power pulses, a non-complement output and a complement output; first and second sources of spaced power pulses respectively energizing said power inputs, each source producing its power pulses during the spaces between pulses of the other source; means for combining the complement outputs of the first and second magnetic amplifier means; feedback means responsive to the combined complement outputs; a first gate which energizes the first control input when potential appears at the second source concurrently with absence of potential on the feedback means; and a second gate which energizes the second control input when potential appears at the first source concurrently with absence of potential on the feedback means.

12. An electrical circuit as defined in claim 11 having set input means for energizing one of the control inputs and reset input means for effecting a signal in the output of the feedback means when none exists in the input thereof.

13. An electrical circuit comprising first and second magnetic amplifiers, each having the following: a single core, an input coil on the core, a power winding on the core and having a complement output, and a secondary winding on the core for producing a non-complement output; means for combining the complement outputs; means for combining the non-complement outputs; feedback means responsive to one of said combined outputs; first and second sources of spaced power pulses each of which produces its pulses during the spaces between pulses of the other source; means connected to the first source to pass current through the power winding of the first magnetic amplifier; means connected to the second source to pass current through the power winding of the second magnetic amplifier; and gating means responsive to a predetermined condition at the feedback means during the period of a pulse at the second source for providing predetermined control of the input winding of the first magnetic amplifier and responsive to a predetermined condition at the feedback means during the period of a pulse at the first source for providing predetermined control of the input winding of the second magnetic amplifier.

14. A flip-flop circuit comprising first and second magnetic amplifiers, each having the following: a single core, an input coil on the core, a power winding on the core and having a complement output, and a secondary winding on the core for producing a non-complement output; means for combining the complement outputs; means for combining the non-complement outputs; feedback means having an input for receiving the combined non-complement outputs; first and second sources of spaced power pulses each of which produces its pulses during the spaces between pulses of the other source; gating means for energizing the input of the first magnetic amplifier when there is current flowing in the feedback means concurrently with presence of a power pulse at the second source and for energizing the input of the second magnetic amplifier when there is current flowing in the feedback means concurrently with presence of a power pulse at the first source; set input means for energizing the input of one of the magnetic amplifiers in response to a set input signal; and reset input means for effectively interrupting flow of feedback current in the feedback means in response to a reset input signal.

15. A flip-flop circuit comprising first and second magnetic amplifiers, each having the following: a single core, an input coil on the core, a power winding on the core and having a complement output, and a secondary winding on the core for producing a non-complement output; means for combining the complement outputs; means for combining the non-complement outputs; feedback means having an input for receiving the combined complement outputs; first and second sources of spaced power pulses each of which produces its pulses during the spaces between pulses of the other source; gating means which energizes the input of the first magnetic amplifier when there is no current flowing in the feedback means concurrently with the presence of a power pulse at the second source and which energizes the input of the second magnetic amplifier when there is no current flowing in the feedback means concurrently with the presence of a power pulse at the first source; set input means which energizes one of the inputs of one of the magnetic amplifiers in response to a set input signal; and reset inputs for effectively inhibiting said gating means from energizing either control input in response to a reset input signal.

16. A flip-flop circuit as defined in claim 14 in which the sources are alternating current sources that go negative during the spaces between power pulses.

17. A flip-flop circuit as defined in claim 15 in which the sources are alternating current sources that go negative during the spaces between power pulses.

18. A flip-flop circuit as defined in claim 14 in which both complemented currents when combined have the same polarity so that a continuous direct current results from them and both non-complemented currents when combined have the same polarity so that a continuous direct current results from them.

19. A flip-flop circuit as defined in claim 15 in which both complemented currents when combined have the same polarity so that a continuous direct current results from them and both non-complemented currents when combined have the same polarity so that a continuous direct current results from them.

20. An electrical circuit comprising first and second magnetic amplifier means each having a control input, a power input for receiving power pulses, a non-complement output, and a complement output; first and second sources of spaced pulses respectively energizing said power inputs, each source producing its pulses during the spaces between pulses of the other source; means combining the non-complement output of each amplifier with the complement output of the other; feedback means responsive to one of the combined outputs; gating means controlled by said feedback means and said sources whereby the signals in the feedback means coming from one of the magnetic amplifier means controls the control input of the other magnetic amplifier means so that the circuit has two stable states; and input means including a set input for controlling at least one of the control inputs and a reset input for controlling the feedback means.

21. An electrical circuit comprising first and second magnetic amplifier means each having a control input, a power input and an output; said output in the case of one amplifier being a complementing one and in the case of the other amplifier being a non-complementing one; means for combining said outputs together; feedback means responsive to said combined output; first and second sources of spaced power pulses each of which produces its pulses in the spaces between pulses of the other source, the first source energizing the power input of the first amplifier means and the second source energizing the power input of the second amplifier means; and gating means controlled by the feedback means and said sources for controlling the input of the first magnetic amplifier means in accordance with the output of the second and for controlling the input of the second magnetic amplifier means in accordance with the output of the first.

22. An electrical circuit as defined in claim 21 including input means for controlling one of the control inputs with set input signals and the feedback means with reset signals whereby alternate energizations of the set and reset inputs will alternately shift the circuit between first and second stable states.

23. A flip-flop circuit comprising first and second magnetic amplifier means each having a core, a control input, a power winding having a complement output and a secondary winding having a non-complement output; means combining one output of one amplifier with one output of the other amplifier; feedback means fed by said combined output; first and second sources of spaced pulses with the pulses of each source occurring during the spaces between pulses of the other source; gating means controlled by the feedback means and by said sources for controlling the control input of each amplifier according to the output of the other one so the device may assume first and second stable states depending on the flow of signals to the control inputs; and input means for energizing a control input and placing the circuit in one stable state in response to a set input signal and controlling the feedback circuit to place the circuit in another stable state in response to a reset input signal.

24. A flip-flop circuit comprising first and second magnetic amplifier means each having a control input, a power input and an output; means for combining the outputs of said amplifiers; first and second sources of power pulses for respectively energizing said power inputs, the power pulses of one source occurring during the spaces between power pulses of the other source; feedback means responsive to said combined output; gating means controlled by the two sources and by the feedback means for controlling the input of each amplifier by the output of the other; and input means controlling one of the control inputs in response to set input signals and the feedback means in response to reset input signals.

25. In a flip-flop circuit; first and second magnetic amplifiers each having an input winding, a direct output winding, a complement output winding, a first source of power pulses in series with the direct output winding, and a second source of power pulses in series with the complement output winding for producing pulses which occur during the spaces between pulses of the first source; the pulses of the first source of the first amplifier occurring during the spaces between the pulses of the first source of the second amplifier; rectifiers respectively in series with each direct output winding for allowing power pulses to pass; rectifiers respectively in series with each complement output winding; means connected to the other ends of the last-named rectifiers for giving a complement output when large currents are inhibited from flowing through the complement output windings; and feedback means connected to both of the direct output windings and to the input windings to effect recycling of the system; and input means for setting and resetting the circuit.

26. In a flip-flop circuit; magnetic amplifier means including at least one input winding means, at least one direct output winding means and at least one complement output winding means; means connected to the direct output winding means for giving a continuous current direct output in response to low impedance of the direct output winding means; means connected to the complement output winding means for giving a continuous current complement output when the complement output winding means has high impedance; feedback means for feeding one of the continuous current outputs back to the input winding means to effect recycling of the system; and input means to effect setting and resetting of the circuit according to input signals.

27. A flip-flop circuit according to claim 26 having only one input winding, only one direct output winding and only one complement output winding.

28. A flip-flop circuit comprising a magnetic amplifier having an input, a non-complement output and a complement output, a set input for controlling said first-named input, feedback means from one of said outputs to the first-named input to effect recycling of the circuit, and reset means controlling the feedback circuit, the complement and non-complement outputs having delay elements cooperating therewith for filling in the gaps between the output pulses to provide continuous current outputs from the circuit.

29. A flip-flop circuit comprising a magnetic amplifier having an input, a non-complement output and a complement output, a set input for controlling said first-named input, feedback means from one of said outputs to the first-named input to effect recycling of the circuit, and reset means controlling the feedback circuit, a delay element in the direct output which fills in the gaps between output pulses to form a continuous output, the feedback means feeding this continuous output back to the input to thereby control the magnetic amplifier.

30. A flip-flop circuit comprising a core, an input winding on the core, a direct output winding on the core, a complement output winding on the core, means tending to pass spaced pulses through the direct and complement windings, means including a delay element for producing a continuous current direct output when the direct output winding presents low impedance to the pulses applied thereto, means including a delay element for producing a continuous current complement output when the complement output winding presents high impedance to the pulses applied thereto, feedback means for feeding one of the continuous current outputs back to the input winding to effect recycling of the system, and input means for controlling the current in the input winding to control the setting and resetting of the circuit.

31. An electrical circuit comprising first and second magnetic amplifier means, each having a control input, a power input for receiving power pulses, a non-complement output and a complement output; first and second sources of spaced power pulses respectively supplying pulses to the two power inputs, each of said sources producing its pulses during the spaces between pulses of the other source; means for combining one of the outputs of the first amplifier with one of the outputs of the second; means for combining the other output of the first amplifier with the other output of the second; and means including a feedback circuit responsive to the signals at one of said combined outputs, for controlling said control inputs whereby the circuit will recycle once a given signal flows in the feedback circuit.

No references cited.